(12) United States Patent
Komiya et al.

(10) Patent No.: US 8,023,511 B2
(45) Date of Patent: Sep. 20, 2011

(54) COMMUNICATION SYSTEM, OPTICAL LINE TERMINAL, AND CONGESTION CONTROL METHOD

(75) Inventors: Kenta Komiya, Chigasaki (JP); Ryosuke Kurata, Chofu (JP); Tohru Kazawa, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 136 days.

(21) Appl. No.: 12/489,611

(22) Filed: Jun. 23, 2009

(65) Prior Publication Data

US 2010/0020690 A1 Jan. 28, 2010

(30) Foreign Application Priority Data

Jul. 25, 2008 (JP) ................. 2008-192740

(51) Int. Cl.
*H04L 12/56* (2006.01)
*H04H 20/71* (2008.01)

(52) U.S. Cl. .................. 370/390; 370/230; 370/312

(58) Field of Classification Search .................. None
See application file for complete search history.

(56) References Cited

U.S. PATENT DOCUMENTS

| 2006/0104275 A1 | 5/2006 | Dohm |
| 2006/0133274 A1 | 6/2006 | Lee et al. |
| 2007/0121629 A1 | 5/2007 | Cuijpers et al. |
| 2008/0095093 A1* | 4/2008 | Oogushi et al. ............. 370/312 |
| 2009/0046615 A1* | 2/2009 | Shibata et al. ............. 370/312 |

FOREIGN PATENT DOCUMENTS

JP 2007-189512 7/2007

OTHER PUBLICATIONS

"Gigabit-capable passive optical network (GPON)", Recommendation G. 984, Telecommunication Standardization Sector of the International Telecommunication Union (ITU-T), Feb. 2004.

* cited by examiner

*Primary Examiner* — Ricky Ngo
*Assistant Examiner* — Clemence Han
(74) *Attorney, Agent, or Firm* — Antonelli, Terry, Stout & Kraus, LLP.

(57) ABSTRACT

Congestion caused by a large number of IGMP requests sent from set top boxes at channel switching is prevented in an optical line terminal (OLT). An IGMP processing section in the OLT has a delayed data generation threshold and a delayed data transmission threshold. When the number of ONTS participating in a multicast group is increased, the OLT generates a delayed multicast group for video data. The delayed multicast group having a few second delay accommodates a new user. With this, the end time of a highly popular program and a commercial start time are shifted among users to prevent, in the OLT, congestion caused by IGMP requests sent for channel switching at an identical time point.

10 Claims, 16 Drawing Sheets

| RE-ARRANGEMENT NUMBER | DELAY (s) | MC GROUP NAME | MC ADDRESS SENT FROM VIDEO SERVER | MC ADDRESS AFTER CONVERSION AT L2SW | TOTAL NUMBER OF ONTS PARTICIPATING IN MC GROUP |
|---|---|---|---|---|---|
| 0 | 0 | MC GROUP A0 | MC ADDRESS A0 | MC ADDRESS A0 | 5 |
| 1 | 5 | DELAYED MC GROUP A1 | MC ADDRESS A0 | MC ADDRESS A1 | 7 |
| 2 | 10 | DELAYED MC GROUP A2 | MC ADDRESS A0 | MC ADDRESS A2 | 3 |

| MC GROUP NAME \ ONT NAME | ONT1 | ONT2 | ONT3 | ONT4 | ONT5 | ONT6 | NUMBER OF PARTICIPATING ONTS |
|---|---|---|---|---|---|---|---|
| MC GROUP A0 | JOIN | | | JOIN | JOIN | JOIN | 4 |
| MC GROUP B0 | - | - | - | - | - | - | - |
| MC GROUP C0 | - | - | - | - | - | - | - |

FIG. 4

| MANAGEMENT NUMBER | DELAY (s) | MC GROUP NAME | MC ADDRESS SENT FROM VIDEO SERVER | MC ADDRESS AFTER CONVERSION AT L2SW | TOTAL NUMBER OF ONTS PARTICIPATING IN MC GROUP |
|---|---|---|---|---|---|
| 0 | 0 | MC GROUP A0 | MC ADDRESS A0 | MC ADDRESS A0 | 15 |
| 1 | 5 | DELAYED MC GROUP A1 | MC ADDRESS A0 | MC ADDRESS A1 | 9 |
| 2 | 10 | DELAYED MC GROUP A2 | MC ADDRESS A0 | MC ADDRESS A2 | 0 |

| RE-ARRANGEMENT NUMBER | DELAY (s) | MC GROUP NAME | MC ADDRESS SENT FROM VIDEO SERVER | MC ADDRESS AFTER CONVERSION AT L2SW | TOTAL NUMBER OF ONTS PARTICIPATING IN MC GROUP |
|---|---|---|---|---|---|
| 0 | 0 | MC GROUP A0 | MC ADDRESS A0 | MC ADDRESS A0 | 5 |
| 1 | 5 | DELAYED MC GROUP A1 | MC ADDRESS A0 | MC ADDRESS A1 | 7 |
| 2 | 10 | DELAYED MC GROUP A2 | MC ADDRESS A0 | MC ADDRESS A2 | 3 |

COMMUNICATION SYSTEM, OPTICAL LINE TERMINAL, AND CONGESTION CONTROL METHOD

CLAIM OF PRIORITY

The present application claims priority from Japanese patent application JP 2008-192740 filed on Jul. 25, 2008, the content of which is hereby incorporated by reference into this application.

BACKGROUND OF THE INVENTION

1. Field of the Invention

The present invention relates to communication systems, optical line terminals (OLTs), and congestion control methods, and more particularly, to a communication system, an optical line terminal, and a congestion control method for preventing Internet group management protocol (IGMP) requests generated when video service viewing users switch the channels, from congesting in the optical line terminal in a passive optical network (PON).

2. Description of the Related Art

To transmit and receive large-size data and image signals through communication networks, the networks have been improved to have a higher rate and a wider band. PONs, which are defined by "Gigabit-capable passive optical network (GPON)", Recommendation G. 984, Telecommunication Standardization Sector of the International Telecommunication Union (ITU-T), and other rules, have been introduced.

FIG. 1 shows the structure of a network in a PON system.

The network in the PON system includes, for example, a video service provider 17, an Internet service provider 18, a voice service provider 19, a router 16-1, an OLT 10, a core optical fiber 11, an optical splitter 12, a plurality of local optical fibers 13, optical network terminals (ONTs) 14-1 to 14-3, and terminals 15-1 to 15-3.

As shown in FIG. 1, for example, in the PON system, an upstream (service-provider-side) communication network is connected to the OLT 10 through the router 16-1; and the ONTs 14-1 to 14-3, which accommodate a plurality of subscriber terminals, are connected to the OLT 10 through a PON which includes the core optical fiber 11, the optical splitter 12, and the plurality of local optical fibers 13. The upstream network includes, for example, the video service provider 17, the Internet service provider 18, and the voice service provider 19. The ONTs 14-1 to 14-3 are respectively connected to the terminals 15-1 to 15-3 (such as set top boxes (STBs), telephones, and PCs).

Client data (such as video data sent by the video service provider 17, data sent by the Internet service provider 18, and voice calls and other service data for general subscribers sent by the voice service provider 19) is mainly transferred between the OLT 10 and the ONTs 14-1 to 14-3 (this part is also called a PON zone).

As broader bands have been used, IP multicast technologies, which distribute an identical content, such as video data, to a specified large number of users efficiently, have attracted attention. As such a technology, IGMP, recommended by the Internet Engineering Task Force (IETF), has been widely spread. In IGMP, a router that supports multicast (hereinafter also called a multicast router), such as the router 16-1, manages subscriber terminals, such as the ONTs 14-1 to 14-3, serving as members of each multicast group in a connection network and distributes identical data to a specified large number of subscriber terminals in each multicast group.

FIG. 2 is a sequence diagram for IGMP requests and video data stream in video multicast.

In multicast distribution using IGMP, an STB serving as a subscriber terminal uses IGMP to send a join request (IGMP join) 21 or a leave request (IGMP leave) 26 (these requests may be called just IGMP requests) for joining or leaving from a multicast group to a multicast router or to a video server; multicast group management apparatuses, such as an ONT, an OLT, and the multicast router, manage joins 22-1 to 22-3 to the multicast group and leaves 27-1 to 27-3 from the multicast group; and various types of multicast data is sent from a data distribution apparatus, such as a video server, only to the members (user terminals) participating in the multicast group with the members of the multicast group held at the multicast group management apparatuses being referenced.

SUMMARY OF THE INVENTION

Recently, the use of fiber to the home (FTTH) has been spreading, where optical fibers are drawn into subscriber homes as data transmission paths, because the data communication rate is high; video, data, and voice calls (triple play) can be provided through one line; and the service fee has been lowered. As the number of FTTH subscribers has been increased, the number of users who receive services from one OLT has also been increased. In such a situation, when a large number of users, such as STBs, switch the channels (meaning that change the multicast groups) at the same time under one OLT in an IP video multicast distribution, which is one of main services of triple play, a problem may arise. The problem will be described below.

To switch the channels, the STBs use IGMP to send multicast (hereinafter called MC sometimes for simplicity) group changes to the ONTs, the OLT and the multicast router. An MC group processing function section in the OLT (generally, a layer-2 switch (L2SW) in the OLT) receives a large number of IGMP requests for MC group changes. The MC group processing function section may be congested with the IGMP requests. In such a case, the MC group processing function section cannot handle the IGMP requests for MC group changes sent from the STBs in some cases, leading to deterioration and delays in channel switching responses and then adversely affecting communication quality.

Accordingly, an object of the present invention is to prevent degraded switching responses caused by congestion in the OLT by IGMP requests sent by users for video channel switching (MC group changes) even if FTTH users increase in the future and users for which the OLT provides services increase.

Another object of the present invention is to prevent degraded channel switching responses caused by congestion in the OLT by a large number IGMP requests sent by many users, made possible by the future technical progress.

Still another object of the present invention is to automatically disperse distribution at a plurality of timing by means of a mechanism closed inside a PON system without changing the program arrangement while the upstream video distribution function section does not pay any attention, to disperse the timing of users' channel switching to allow the IGMP peak processing performance required for an optical access network of the OLT and downstream devices and for network units, a video server, and other units disposed upstream of the OLT to be lowered.

To solve the above-described problem, an MC group processing function section provided for an L2SW in an OLT manages the number of users who are watching each channel (for example, the number of ONTs participating in each MC group) by a table in the present invention. When the number of users who participates in an identical MC group exceeds a threshold (this threshold can be changed as desired by an OLT administrator or maintenance person) defined in advance in a table in the L2SW, the OLT makes a delay buffer in the OLT generate, in addition to the MC group to which distribution has been performed so far (hereinafter an MC group to which a delay is not given by the delay buffer in the OLT is called a usual MC group), an MC group (hereinafter called a delayed MC group) to which the same data, for example, the same content, as that distributed to the usual MC group is distributed but the distribution time is delayed by about several seconds from that for the usual MC group, after the L2SW changes the multicast IP address of the usual MC group. Then, the L2SW requests each ONT to make an IGMP processor in the ONT convert, when an STB sends a join request for joining the usual MC group by using IGMP, the join request for joining the usual MC group to a join request for joining the delayed MC group and to send the join request to the OLT. With this processing, when a user, for example, an STB, sends a new join request for joining the usual MC group for which the threshold has been exceeded, the user is accommodated into the delayed MC group. When the number of users participating in the delayed MC group reaches the threshold, another delayed MC group having a further increased delay is generated, and a new user who wants to join the usual MC group is accommodated into this another delayed MC group. In this manner, when the threshold specified in advance in the OLT is exceeded, a delayed MC group to which the same video data as that distributed to the usual MC group is distributed but the distribution time is delayed by several seconds from that for the usual MC group is generated, and a new user is accommodated into the delayed MC group. Repeating this operation prevents the number of users participating in one MC group from reaching or exceeding the threshold specified in the L2SW of the OLT and prevents participating users from centering on a specific MC group.

When the number of users participating in one MC group is limited by using the above-described method, the video watching timing, such as the start or end of a broadcasting time, of each user controlled by the OLT for an identical video data is different between the usual MC group and each delayed MC group even at the end of a program having a very high audience rating or the start of a commercial. Therefore, the end time of a video program or the start time of a commercial is dispersed among MC groups. The present invention reduces the probability that STBs disposed at the houses of many users send IGMP requests for channel switching (for changing the MC group) at the same time to the OLT and prevents a large number of IGMP requests from reaching the OLT at the same time.

The present invention provides a communication system in which an optical line terminal (OLT) connected to an upstream (service-provider-side) communication network is connected to optical network terminals (ONTs) accommodating a plurality of subscriber terminals with a passive optical network that includes a core optical fiber, an optical splitter, and a plurality of local optical fibers, and the ONTs are connected to set top boxes (STBs) for IP multicast stream termination. The system includes: means for holding a table for managing each multicast group (meaning an IGMP group) and the number of participants for the multicast group in an Internet group management protocol (IGMP) processing section provided for the OLT and determines that the number of users participating in a multicast group exceeds or falls below a threshold held in the OLT; means for making a delay buffer provided for the OLT generate one or a plurality of delayed multicast groups having group IDs different from the group ID of the original multicast group, which distribute the same content as the multicast group but the distribution timing is delayed by a specified delay time held in the OLT; means for converting the group ID of a multicast group for which an STB sent a join request to the group ID of another multicast group in an IGMP processor provided for each ONT and reports this conversion to the IGMP processing section in the OLT; and means for instructing the group ID of the conversion-target multicast group and the group ID of the after-conversion multicast group, from the IGMP processing section of the OLT to the IGMP conversion means of each ONT. When the IGMP processing section of the OLT determines that the number of users participating in a specific multicast group becomes equal to or larger than the threshold, the IGMP processing section checks whether a multicast group exists for which the same content is distributed with a different delay time and the number of connecting users falls below the threshold, and if there is no such multicast group, the IGMP processing section makes the delay buffer provided for the OLT start generating a delayed multicast group. The IGMP processing section of the OLT instructs the IGMP conversion means of each ONT to convert the connection request for the multicast group for which the threshold has been exceeded to a connection request for another multicast group having the same content but a different delay time, and the connecting users are dispersed to a plurality of multicast groups having the same content but time differences.

The IGMP processing section provided for the OLT may be configured such that it further includes a table for managing the number of participants for a delay multicast group and means for recognizing that the number of ONTs participating in a multicast group becomes zero, and, when the number of ONTs participating in a delay multicast group becomes zero, the generation of a delay multicast group and the accommodation into the delay multicast group, performed by the delay buffer are finished, and the multicast group for which the number of participating ONTs becomes zero is deleted from the table for managing the number of participants for each delay multicast group in the L2SW. With this, a plurality of multicast groups which have been used can be deleted.

According to the first solving means of this invention, there is provided a communication system in which an optical line terminal (OLT) connected to a multicast (MC) stream server is connected to one or a plurality of optical network terminals (ONTs) for MC stream termination accommodating one or a plurality of subscriber terminals with a passive optical network that includes a core optical fiber, an optical splitter/coupler, and a plurality of local optical fibers, the OLT comprising:

an ONT management table for recording the number of participating ONTs for each identification information of an MC group serving as a group of MC stream;

a delayed MC group management table for managing a before-conversion MC address, an after-conversion MC address, and the number of ONTs participating in a corresponding MC group or delayed MC group, sent from the server, in response to identification information of each MC group or identification information of a delayed MC group serving as a group for delayed stream having the same content as the MC stream with distribution timing delayed by a delay time specified in advance from the MC stream;

an MC group conversion request table for storing identification information of an after-conversion MC group corresponding to identification information of a before-conversion MC group;

a delay buffer for generating one or a plurality of delayed stream in response to the identification information of the after-conversion MC group and for distributing the delayed stream; and a processing section for generating or changing the ONT management table, the delayed MC group management table, and/or the MC group conversion request table according to a join request received from one of the subscriber terminals, for controlling the delay buffer, and for distributing the stream;

wherein each of the ONTs comprising an MC group conversion table for storing the identification information of an after-conversion MC group in association with the identification information of a before-conversion MC group for which the join request was sent, for current participation and next-time participation;

when the processing section of the OLT references the ONT management table and finds according to the identification information of the MC group for which the join request was sent from the subscriber terminal that the number of ONTs participating in the MC group is larger than a threshold determined in advance, if the processing section of the OLT references the delayed MC group management table and finds that the number of ONTs participating in any MC group or delayed MC group does not exceed the threshold determined in advance, the processing section of the OLT generating the MC group conversion request table according to a before-conversion MC address and an after-conversion MC address of the MC group or the delayed MC group for which the threshold is not exceeded; and the processing section of the OLT distributing the data of the MC group conversion request table as a conversion request to the one or the plurality of ONTs;

the processing section of the OLT sending the MC stream received from the video server, corresponding to the after-conversion MC address or the identification information of the delayed group, to the delay buffer, and making the delay buffer start or continue generating delayed stream with a delay determined in advance;

when each of the ONTs receives the conversion request from the OLT, the ONT storing the identification information of the after-conversion MC group in association with the identification information of the before-conversion MC group, in a next-time participation entry of the MC group conversion table;

when each of the ONTs receives a join request for joining the before-conversion MC group from one of the subscriber terminals, the ONT converting the identification information of the before-conversion MC group to the identification information of the after-conversion MC group according to the next-time participation entry of the MC group conversion table and sending a join request to the OLT; and the OLT distributing the delayed stream from the delay buffer to the ONT according to the identification information of the before-conversion MC group.

According to the second solving means of this invention, there is provided an opitical line terminal (OLT) in a communication system in which the OLT connected to a multicast (MC) stream server is connected to one or a plurality of optical network terminals (ONTs) for MC stream termination accommodating one or a plurality of subscriber terminals with a passive optical network that includes a core optical fiber, an optical splitter/coupler, and a plurality of local optical fibers, the OLT comprising:

an ONT management table for recording the number of participating ONTs for each identification information of an MC group serving as a group of MC stream;

a delayed MC group management table for managing a before-conversion MC address, an after-conversion MC address, and the number of ONTs participating in a corresponding MC group or delayed MC group, sent from the server, in response to identification information of each MC group or identification information of a delayed MC group serving as a group for delayed stream having the same content as the MC stream with distribution timing delayed by a delay time specified in advance from the MC stream;

an MC group conversion request table for storing identification information of an after-conversion MC group corresponding to identification information of a before-conversion MC group;

a delay buffer for generating one or a plurality of delayed stream in response to the identification information of the after-conversion MC group and for distributing the delayed stream; and a processing section for generating or changing the ONT management table, the delayed MC group management table, and/or the MC group conversion request table according to a join request received from one of the subscriber terminals, for controlling the delay buffer, and for distributing the stream;

wherein, when the processing section of the OLT references the ONT management table and finds according to the identification information of the MC group for which the join request was sent from the subscriber terminal that the number of ONTs participating in the MC group is larger than a threshold determined in advance, if the processing section of the OLT references the delayed MC group management table and finds that the number of ONTs participating in any MC group or delayed MC group does not exceed the threshold determined in advance, the processing section of the OLT generating the MC group conversion request table according to a before-conversion MC address and an after-conversion MC address of the MC group or the delayed MC group for which the threshold is not exceeded; and the processing section of the OLT distributing the data of the MC group conversion request table as a conversion request to the one or the plurality of ONTs, and making each of the ONTs, according to the conversion request from the OLT, store the identification information of the after-conversion MC group in association with the identification information of the before-conversion MC group, in a next-time participation entry of the MC group conversion table;

the processing section of the OLT sending the MC stream received from the video server, corresponding to the after-conversion MC address or the identification information of the delayed group, to the delay buffer, and making the delay buffer start or continue generating delayed stream with a delay determined in advance;

when each of the ONTs receives a join request for joining the before-conversion MC group from one of the subscriber terminals, the ONT converting the identification information of the before-conversion MC group to the identification information of the after-conversion MC group according to the next-time participation entry of the MC group conversion table and sending a join request to the OLT, and the OLT distributing the delayed stream from the delay buffer to the ONT according to the identification information of the before-conversion MC group.

According to the third solving means of this invention, there is provided a congestion control method in a communication system in which an optical line terminal (OLT) connected to a multicast (MC) stream server is connected to one or a plurality of optical network terminals (ONTs) for MC stream termination accommodating one or a plurality of subscriber terminals with a passive optical network that includes a core optical fiber, an optical splitter/coupler, and a plurality of local optical fibers, when the number of users equal to or larger than a threshold center on a specific MC group, the OLT generating, in a delayed MC group management table for managing a before-conversion MC address, an after-conversion MC address, and the number of ONTs participating in a corresponding MC group or delayed MC group, sent from the server, in response to identification information of each MC group or identification information of a delayed MC group serving as a group for delayed stream having the same content as MC stream with distribution timing delayed by a delay time specified in advance from the MC stream, an entry for the identification information of the delayed MC group, and making a delay buffer for generating one or a plurality of delayed stream in response to the identification information of the after-conversion MC group and for distributing the delayed stream start or continue generating delayed stream with the specified delay time in response to the after-conversion MC address or the identification information of the delayed MC group;

when the ONT receives a new connection request for the before-conversion MC group from the subscriber terminal, the ONT converting the identification information of the before-conversion MC group for which the join request was sent, to the identification information of the after-conversion MC group and sending a connection request for the identification information of the after-conversion MC group of the delayed stream, to the OLT; and the OLT distributing the delayed stream from the delay buffer to the ONT according to the identification information of the after-conversion MC group.

Even if FTTH users increase in the future and users for which the OLT provides services increase, the present invention can prevent degraded switching responses caused by congestion in the OLT by IGMP requests sent by users for video channel switching (MC group changes).

According to ITU-T G. 984.1, the number of PON-zone branches is mainly 64 in the current technology. With the progress of technology and lower power consumption of an OLT, it is expected that the number of PON-zone branches may reach 128. As the number of users for which the OLT provides services is increased by the progress of technology, it is inevitable that the OLT also provides increasing video services.

The present invention can prevent degraded channel switching responses caused by congestion in the OLT by a large number IGMP requests sent by many users, made possible by the future technical progress.

In near video on demand (NVOD), which is one type of communication services, an identical program is distributed a plurality of times with time differences (intervals of several minutes), so that the number of program viewers watching one channel (participating in a multicast group, for example) is dispersed. This may, however, affect program arrangement at the upstream video distribution function side, such as a video server.

According to the present invention, a mechanism closed inside a PON system automatically disperses distribution at a plurality of distribution timing without changing the program arrangement while the upstream video distribution function section does not pay any attention. Therefore, users channel switching timing can be dispersed, allowing the IGMP peak processing performance required for an optical access network of the OLT and downstream devices and for network units, a video server, and other units disposed upstream of the OLT to be lowered.

BRIEF DESCRIPTION OF THE DRAWINGS

FIG. 4 shows an ONT management table.

FIG. 6 shows a delayed MC group management table disposed in the L2SW.

FIG. 13 shows an MC group re-arrangement table.

DESCRIPTION OF THE PREFERRED EMBODIMENTS

Embodiments of the present invention will be described below in detail with reference to the drawings. In the following description, a PON system will be taken as an example to provide an IGMP request congestion control method. The present invention can also be applied to other communication systems which perform data multicast distribution by using IGMP. The present invention can also be applied to protocols other than IGMP, which perform multicast joins and multicase leaves.

1. First Embodiment

Figure 1:
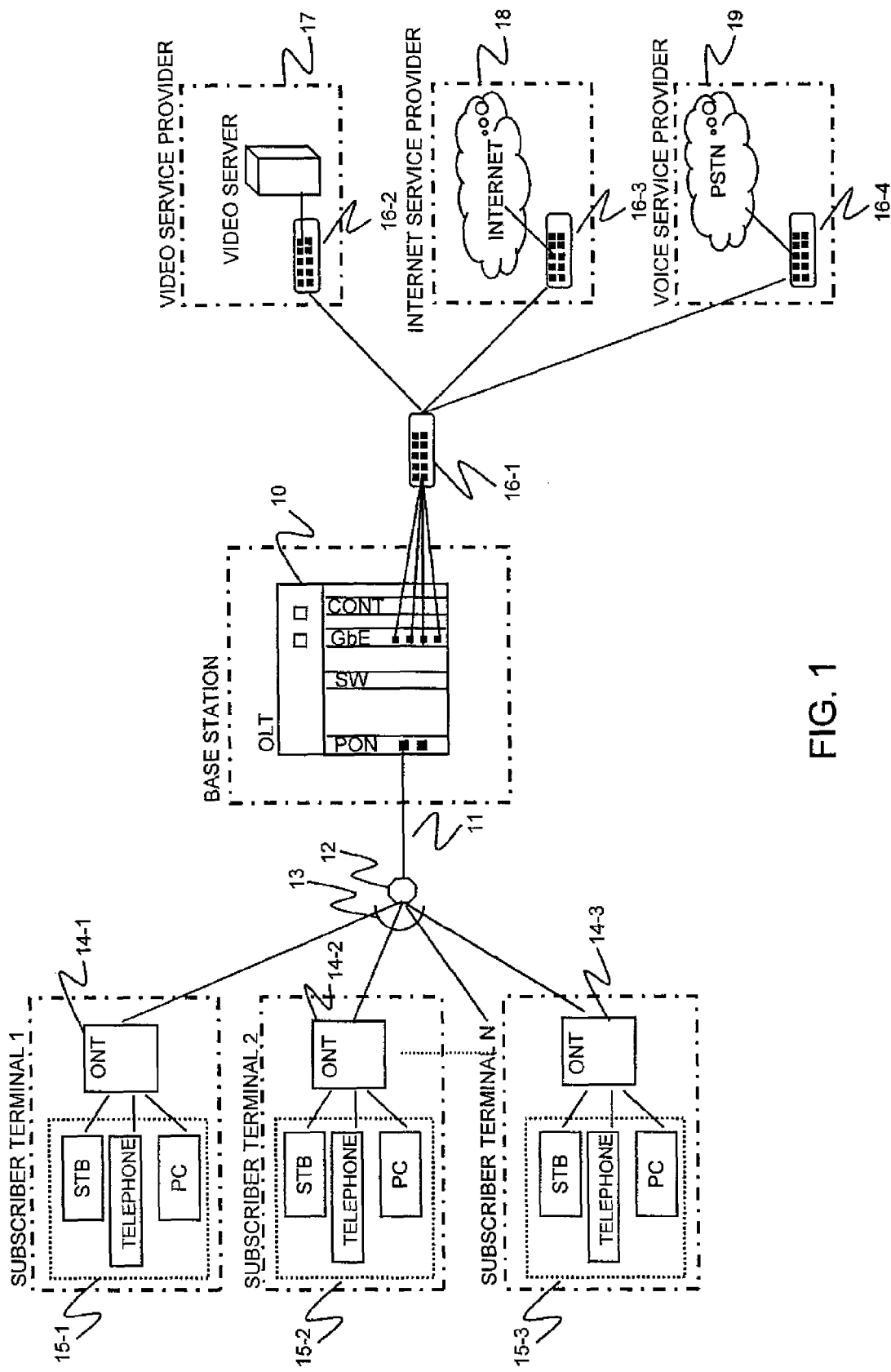
FIG. 1 shows the structure of a network in a passive optical network (PON) system.
Figure 2:
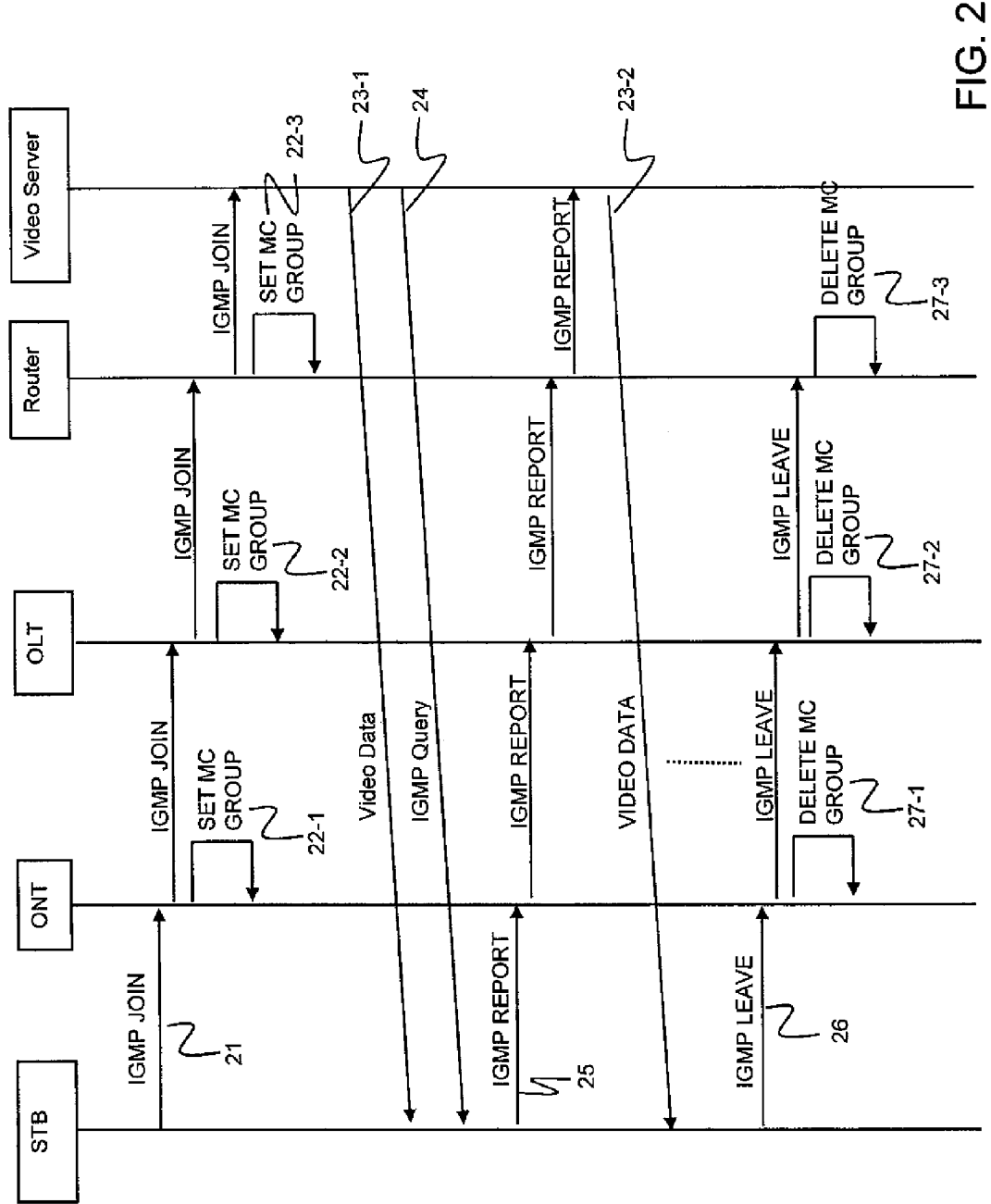
FIG. 2 is a sequence diagram of IGMP requests and video data stream in video multicast.
Figure 3:
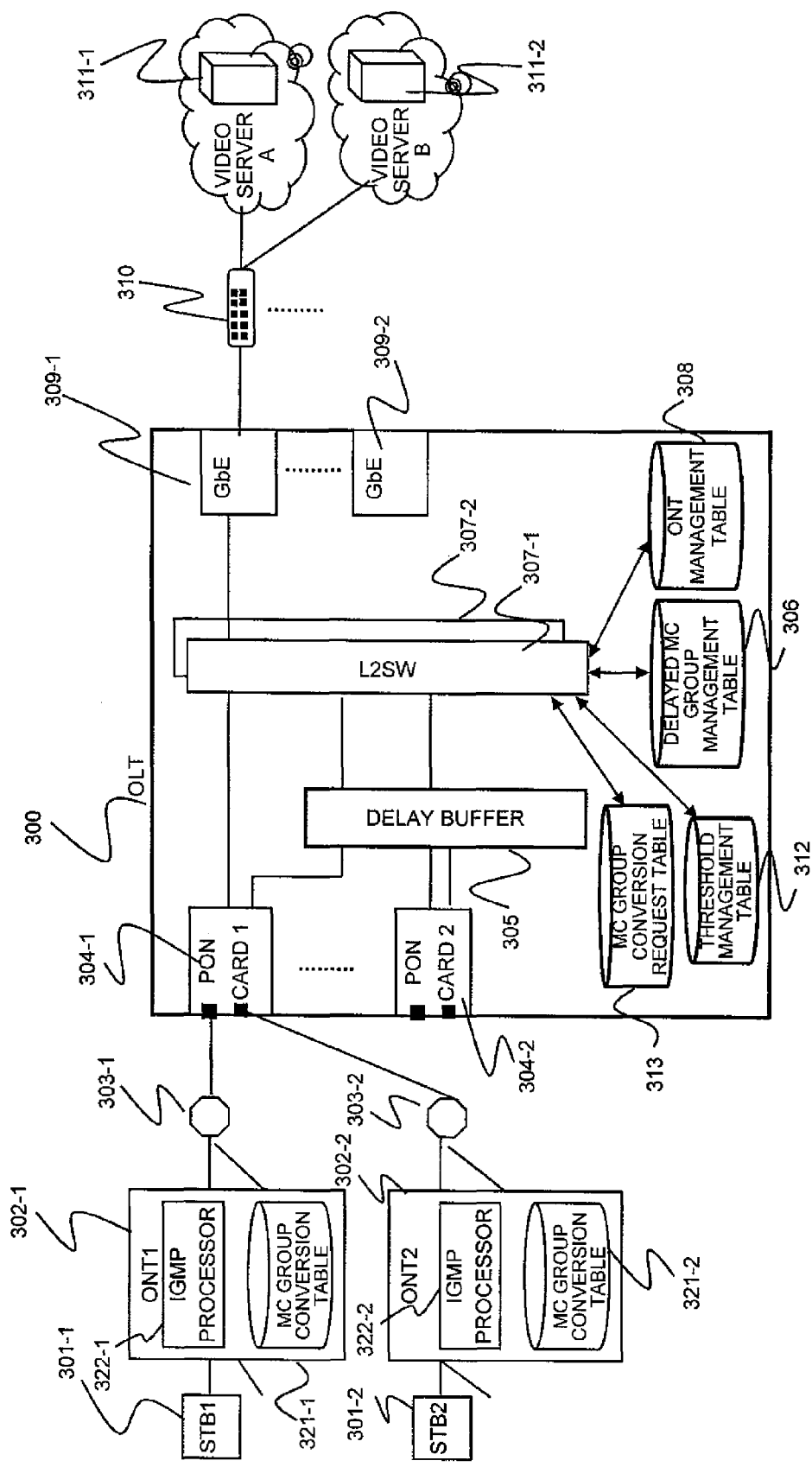
FIG. 3 is a block diagram of a PON system according to a first embodiment of the present invention.

As shown in FIG. 1, the present invention is applied to the network where the OLT 10 is connected to the optical splitter 12 through the core optical fiber 11 and the optical splitter 12 is connected to the ONTs 14-1 to 14-3 through the plurality of local optical fibers 13. Hardware structure FIG. 3 is a block diagram of a passive optical network (PON) system to which the present invention is applied.

The PON system includes, for example, an OLT 300, a plurality of STBs 301-1 and 301-2, a plurality of ONTs 302-1 and 302-2, a plurality of optical splitters 303-1 to 303-2, a router 310 capable of multiple multicast, and video servers 311-1 and 311-2 for distributing video data to users. The OLT 300 includes, for example, a plurality of PON cards 304-1 and 304-2, a delay buffer 305 for giving a delay to an MC group, a delayed MC group management table 306 provided inside or outside an L2SW, a plurality of L2SW cards 307-1 and 307-2 serving as IGMP processing sections, an ONT management table 308 provided inside or outside the L2SW, a plurality of gigabit Ethernet (registered trademark) (GbE) cards 309-1 and 309-2, a threshold management table 312 provided inside or outside the L2SW, and an MC group conversion request table 313 provided inside or outside the L2SW. The ONT 302-1 includes, for example, an IGMP processor 322-1 and an MC group conversion table 321-1. In the same way, the ONT 302-2 includes, for example, an IGMP processor 322-2 and an MC group conversion table 321-2.

Table Structure

FIG. 4 shows the format of the ONT management table 308.

The ONT management table 308 stores the name (multicast IP address in the present embodiment) of each MC group, the names of ONTs, and the number of participating ONTs 401. In the ONT management table 308, the number of participating ONTs 401 indicates that currently 4 ONTs are participating in an MC group A0. The number of participating ONTs 401 are shown in the same way for the other MC groups. In the present embodiment, a character string indicating participation is "join". Other appropriate character string or number can be used. In another embodiment, the number of participants in each MC group can be managed in units of Ethernet ports, for example, Ethernet port IDs, provided for each ONT 302 in the ONT management table 308.

Figure 5:
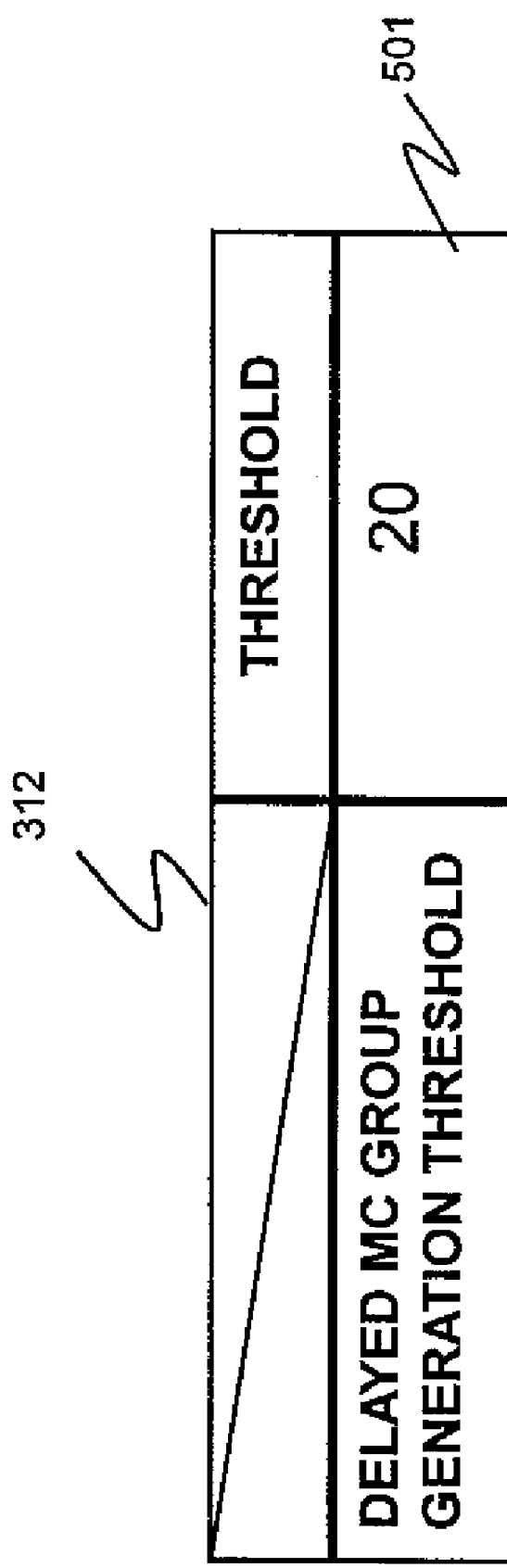
FIG. 5 shows a threshold management table disposed in an L2SW.

FIG. 5 shows the format of the threshold management table 312 provided inside or outside the L2SW for managing a threshold.

The threshold management table 312 stores a delayed MC group generation threshold 501 as a threshold for the L2SW 307. In the threshold management table 312 of the present embodiment, the delayed MC group generation threshold is 20. The threshold is not a fixed value and may be changed as desired by the user or a maintenance person. In addition, a plurality of thresholds may be held. For example, a threshold for determining the start of accommodation into each delayed MC group and a threshold for limiting the number of ONTs which can be accommodated into each MC group may be held.

FIG. 6 shows the format of the delayed MC group management table 306 provided inside or outside the L2SW.

The delayed MC group management table 306 includes a management number 600 assigned in the ascending order of the delay of each MC group, a delay 601, the name 602 (for example, the same address as the multicast IP address after conversion at the L2SW) of each MC group, the original MC address 603 sent from the video server 311, the MC address 604 changed by the L2SW 307, and the total number of ONTs participating in each MC group 605. The delayed MC group management table 306 manages stream having the same data (for example, the same content) but different delays. The delayed MC group management table 306 also stores usual MC groups. In another embodiment, the total number of ONTs participating in each MC group 605 in the delayed MC group management table can be managed in units of Ethernet ports in the ONTs 302.

The L2SW 307 compares the delayed MC group generation threshold 501 in the threshold management table 312 (see FIG. 5) with the number of participating ONTs 401 in the ONT management table 308 (see FIG. 4) and the total number of ONTs participating in each delayed MC group 605 in the delayed MC group management table 306 (see FIG. 6) to determine the start of generating a delayed MC group.

The number of participating ONTs 401 in the ONT management table 308 (see FIG. 4) may be either the number of ONTs participating in each MC group sent from the video server 311 (the total of the total numbers 605 of ONTs participating in the MC groups A0, A1, and A2) or the number of ONTs participating in each usual MC group.

Figure 7:
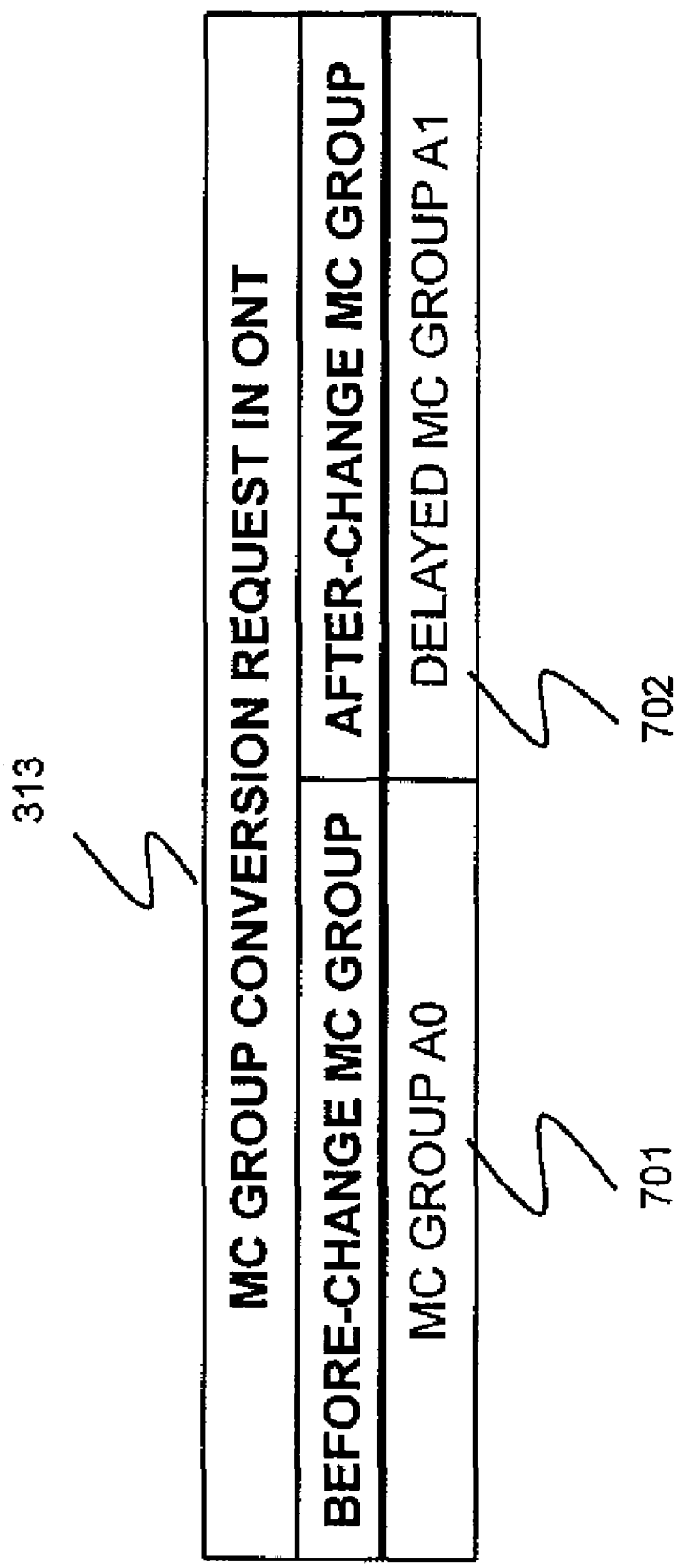
FIG. 7 shows an MC group conversion request table disposed in the L2SW.

FIG. 7 shows the format of the MC group conversion request table 313 provided inside or outside the L2SW.

When the number of ONTs participating in each MC group exceeds the threshold held by the OLT 300, for example, the OLT 300 sends the MC group conversion request table 313 to the IGMP processor 322 of all the ONTs 302 by the multicast technology. The MC group conversion request table 313 includes a before-change MC group 701 and an after-change MC group 702. In FIG. 7, when the STB 301 requests participation in the MC group A0, the IGMP processor 322 of the ONT 302 changes the participation MC group to a delayed MC group A1, and then, sends the request to the OLT 300.

Figure 8:
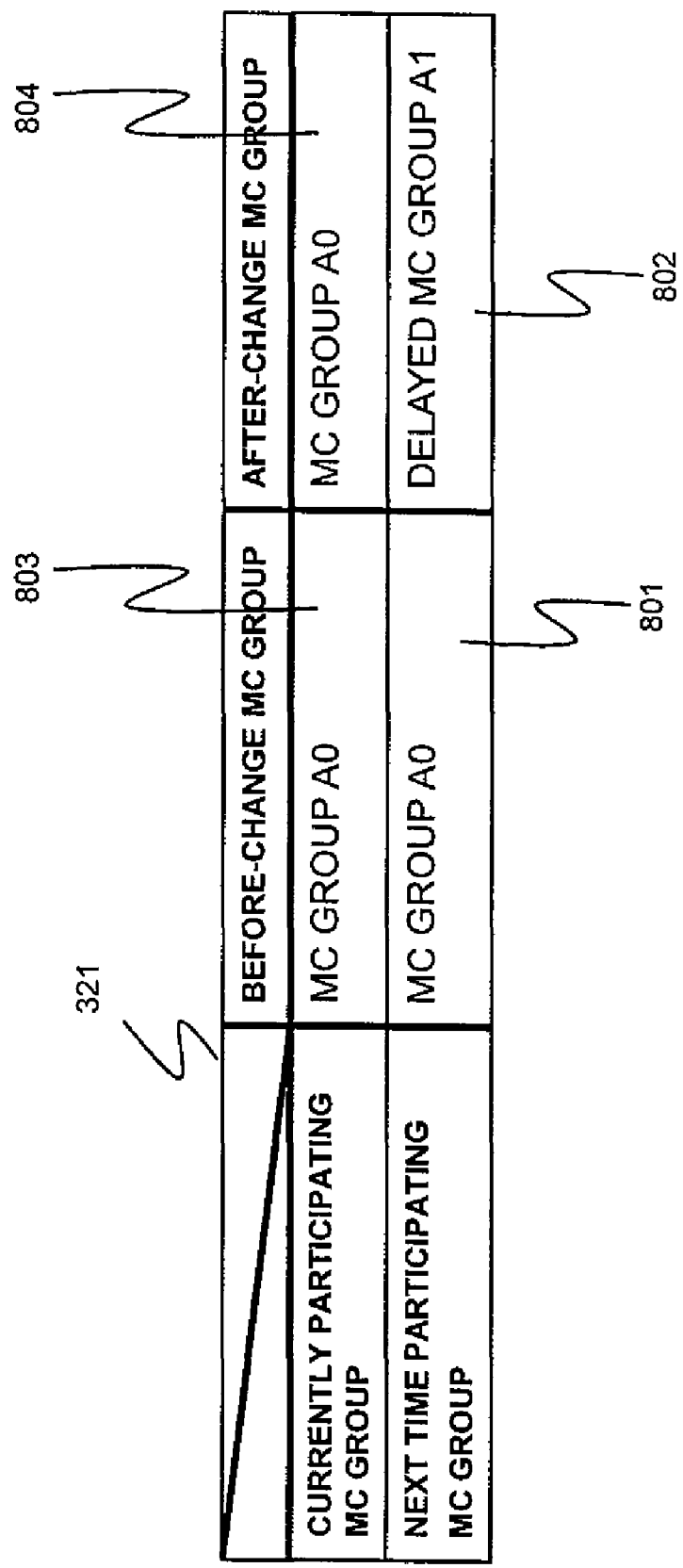
FIG. 8 shows an MC group conversion table.

FIG. 8 shows the format of the MC group conversion table 321.

The MC group conversion table 321 is disposed inside or outside the IGMP processor 322 of the ONT 302. According to the before-change MC group 701 and the after-change MC group 702 in the MC group conversion request table 313 (see FIG. 7) received from the OLT 300, the ONT 302 updates and holds a before-change MC group 801 and an after-change MC group 802 in a row of a next time participating MC group. The MC group conversion table 321 also holds information on the currently participating MC group. The ONT 302 converts the MC group by referencing the next-time participating MC group, and then, copies the before-change MC group 801 and the after-change MC group 802 in the row of the next time participating MC group to a before-change MC group 803 and an after-change MC group 804 in a row of the currently participating MC group, respectively. With this, the ONT 302 can manage the current conversion process and the participation in the MC group. The row of the next time participating MC group is updated every time the data of the MC group conversion request table 313 (see FIG. 7) is received from the L2SW 307.

The ONT 302 may have the MC group conversion table 321 for each MC group, for example, each of MC groups A0 and B0, sent from the video server 311.

Operation

Figure 9:
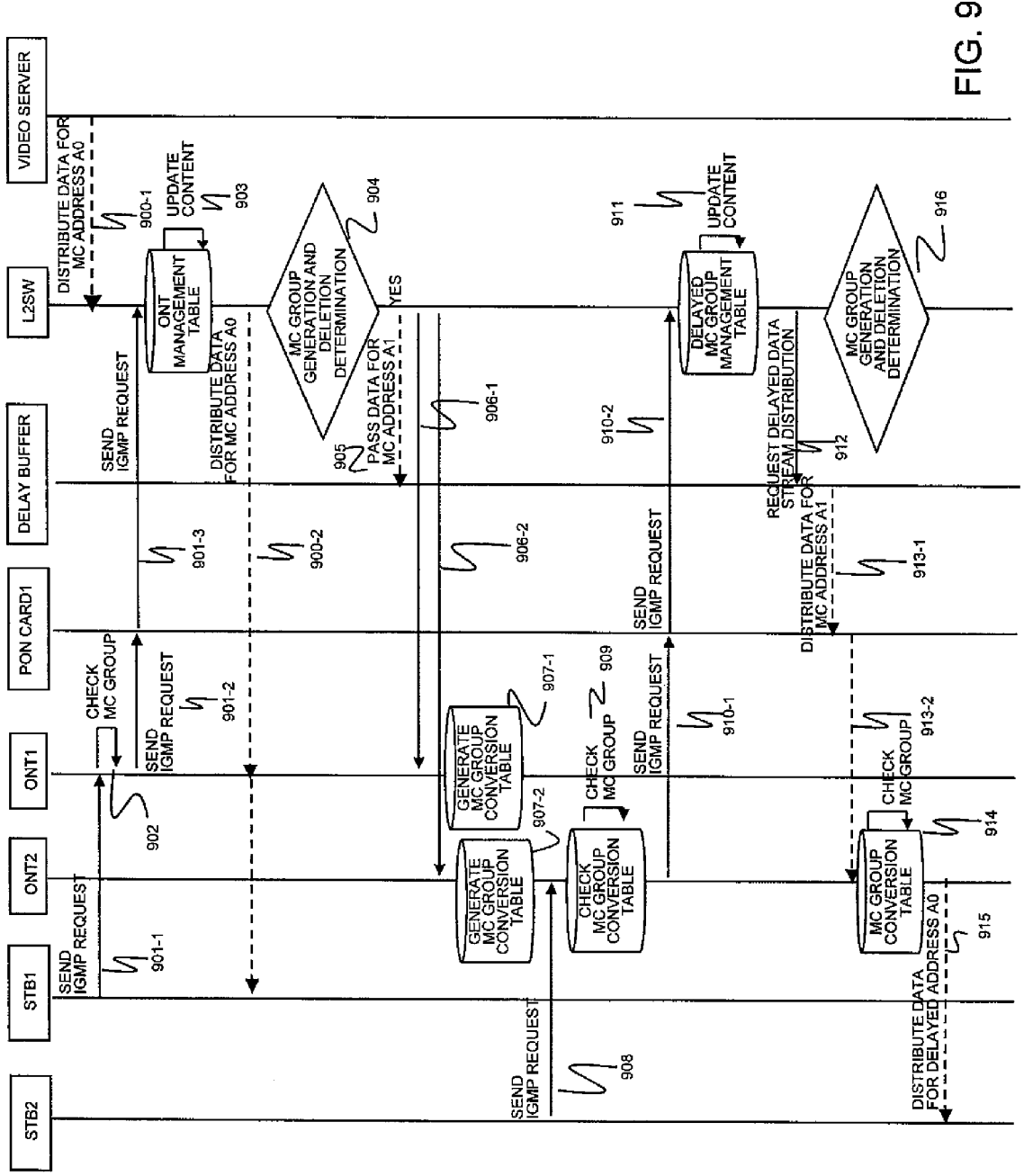
FIG. 9 is a sequence diagram showing a delayed MC group generation method.

FIG. 9 is a sequence diagram showing a delayed MC group generation method.

An example operation will be described below with reference to FIG. 9 in which a delayed MC group is generated for the first time and accommodation into the delayed MC group is performed.

(1) Generating a Delayed MC Group

An IP MC data distribution procedure in a usual state having no congestion will be described first.

When a user joins an MC group (hereinafter an MC group A0 as an example for description), for example, an STB 1 301-1 serving as a subscriber terminal sends an IGMP request (IGMP join) indicating the target MC group to an upstream ONT 1 302-1 as a join request in a process 901-1. When the ONT 1 302-1 receives the IGMP request from the STB 1 301-1, the ONT 1 302-1 uses its IGMP processor 322-1 to check whether the MC group specified in the IGMP request is set in the before-change MC group 801 in the row of the next time participating MC group with reference to the MC group conversion table 321 (see FIG. 8) in a process 902. The generation of the MC group conversion table 321 (FIG. 8) will be described later.

When no data is set in the before-change MC group 801 in the row of the next time participating MC group in the MC group conversion table 321 (see FIG. 8) of the ONT 1 302-1; when data is set in the before-change MC group 801 but it does not match the MC group specified in the join request of the STB 1 301-1; or when the before-change MC group 801 matches the after-change MC group 802; the ONT 1 302-1 sends the IGMP request as is to the PON card 1 304-1 in the OLT 300 in a process 901-2. The PON card 1 304-1 in the OLT 300 sends the IGMP request received from the ONT 1 302-1, to the L2SW 307 in the OLT 300 in a process 901-3.

The L2SW 307 updates the number of participating ONTs 401 for the corresponding MC group in the ONT management table 308 (see FIG. 4) according to the IGMP request received from the PON card 1 304-1, in a process 903. In the ONT management table 308 (see FIG. 4), the correspondence between the identifier of each ONT and the name (for example, the multicast IP address) of an MC group in which the ONT participates, and the number of participating ONTs 401 for each MC group are managed, and the number of participating ONTs 401 is updated, if necessary, by using a join request message or a leave request message for each MC group sent from each ONT 302.

After the L2SW 307 finishes updating the ONT management table 308 (see FIG. 4) in the process 903, when data for the MC group requested by the STB 301 has not yet reached the L2SW 307 from the video server 311 (when an MC group data transmission process (process 900-1) has not yet finished), the L2SW 307 sends the IGMP request to the video server A 311-1 through the GbE 309-1 and the router 310 to request the video server A 311-1 to distribute the data for the MC group to the OLT 300. When the data for the MC group for which the ONT 1 302-1 sent the join request has reached the L2SW 307, the L2SW 307 makes the ONT 1 302-1 belong to the MC group A0 and continues distributing the data for the MC address A0 to the ONT 1 302-1 in a process 900-2. Then, the L2SW 307 performs MC group generation and deletion determination according to the ONT management table 308 (see FIG. 4) updated in the process 903, in a process 904.

The IP MC data distribution procedure for a usual state having no congestion has been described so far.

Figure 10:
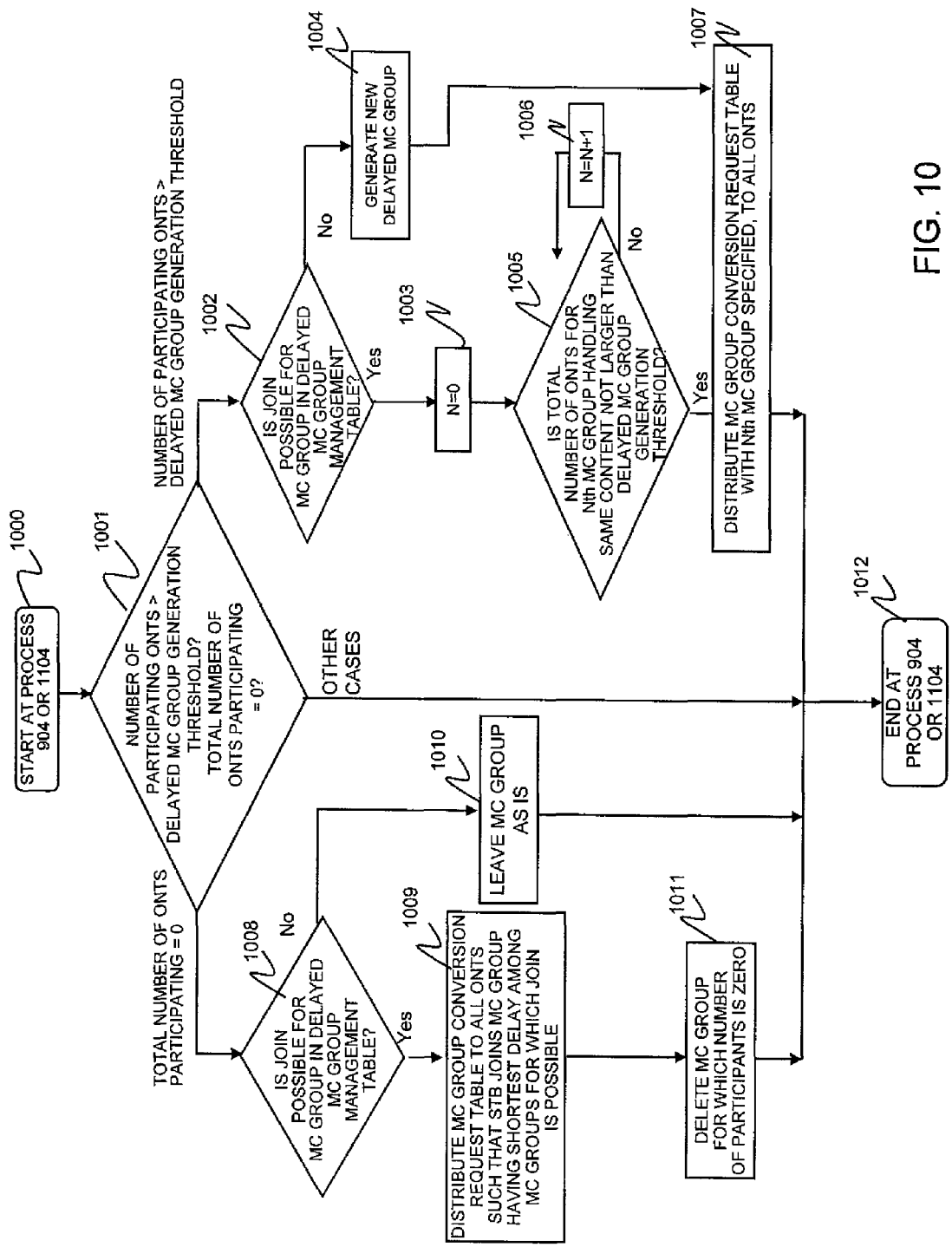
FIG. 10 is a flowchart of the determination logic of delayed MC group generation and deletion based on the ONT management table shown in FIG. 4.

FIG. 10 is a flowchart showing determination logic for delayed MC group generation and delayed mc group deletion according to the ONT management table 308 (see FIG. 4).

The operation in the process 904 will be specifically described below with reference to FIG. 10.

The L2SW 307 compares the number of participating ONTs 401 in the ONT management table 308 (see FIG. 4) updated in the process 903 and the total number of ONTs participating in each MC group 605 in the delayed MC group management table 306 (see FIG. 6) with the delayed MC group generation threshold 501 in the threshold management table 312 (see FIG. 5) in a process 1001. When the number of participating ONTs 401 does not exceed the delayed MC group generation threshold 501, and when the total number of ONTs participating in each MC group 605 is not equal to zero ("other cases" in the process 1001), the L2SW 307 performs nothing in the process 904 and the process is terminated.

An operation for a case when users start to center on a specific program and congestion starts to occur will be described next.

When the L2SW 307 determines in the process 1001 that the number of participating ONTs 401 exceeds the delayed MC group generation threshold 501 (number of participating ONTs>delayed MC group generation threshold in the process 1001), the L2SW 307 determines whether there exists another stream which distributes the same content and for which the number of participating ONTs does not exceed the delayed MC group generation threshold with reference to each MC group in the delayed MC group management table 306 (see FIG. 6) in a process 1002.

When, in any of the delayed MC groups A1, A2, . . . that are currently stored, there exists an MC group for which the total number of ONTs participating in each MC group 605 does not exceed the delayed MC group generation threshold 501, for example, the L2SW 307 determines that a join is possible for an existing MC group (Yes in process 1002). If there is no delayed MC group for which a join is possible in the process 1002, which means, for example, that the total number of ONTs participating in each MC group 605 exceeds the delayed MC group generation threshold 501 in all existing MC groups, or that there is no delayed MC group, the L2SW 307 determines that a join is impossible for an existing MC group (No in process 1002).

When there are one or more MC groups for which a join is possible (Yes in the process 1002), the L2SW 307 searches the delayed MC group management table (see FIG. 6) for an MC group (including usual MC groups) having the shortest delay, in an ascending order of the management number 600 (from N=0) in a process 1005. For example, the L2SW 307 first sets a variable N defined in advance and used for search to an initial value (such as zero) in a process 1003. Then, the L2SW 307 determines whether the total number of ONTs participating in each MC group 605 for the Nth MC group in the delayed MC group management table (see FIG. 6) does not exceed the delayed MC group generation threshold 501 in the threshold management table (see FIG. 5). When the total number of ONTs participating in each MC group 605 exceeds the delayed MC group generation threshold 501, the L2SW 307 increments the variable N by 1 in a process 1006 and executes the process 1005 again. When the total number of ONTs participating in each MC group 605 does not exceed the delayed MC group generation threshold 501 in the process 1005, the L2SW 307 specifies the join-possible MC group having the shortest delay, found in the process 1005, in the MC group conversion request table (see FIG. 7) and distributes the data of the MC group conversion table to all the ONTs 302 in order to send the join request for joining that MC group, in a process 1007.

If it is determined that a join is impossible for the existing MC groups (No in the process 1002), the L2SW 307 generates a delayed MC group having a longer delay than the existing delayed MC group in a process 1004. In a procedure for generating a delayed MC group, the L2SW 307 first specifies the management number 600 (Nth) and the delay 601. Then, the L2SW 307 specifies the MC group name 602 (this can be the MC address after the conversion at the L2SW 307), used to convert the original MC address (such as A0) of the MC group to another MC address (such as A1), and the MC address 603 received from the video server 311. The total number of ONTs participating in each MC group 605 is set to zero because this MC group is newly generated. The L2SW 307 stores the generated information (such as the management number 600, the delay 601, the MC group name 602, the MC address 603 received from the video server 311, the MC address 604 after the conversion at the L2SW 307, and the total number of ONTs participating in each MC group 605) into the delayed MC group management table (see FIG. 6). The L2SW 307 also specifies the MC address 603 received from the video server 311 and the MC address 604 after the conversion at the L2SW 307 in the before-change MC group 701 and the after-change MC group 702 in the MC group conversion request table 313 (see FIG. 7), respectively. The L2SW 307 passes at least the after-change MC address (such as A1), which is another address, or the after-change MC group among the specified data to the delay buffer 305 in a process 905. The L2SW 307 may also pass the delay. Alternatively, without passing the delay, the delay may be specified in advance between the delay buffer 305 and the L2SW 307. When the STB 301 sends a join request for joining the MC group A0, the L2SW 307 further distributes the data of the MC group conversion request table (see FIG. 7) in order to convert the MC group A0 to the MC group A1, to all the ONTs 302 in a process 1007 and in processes 906-1 and 906-2. The delay buffer 305 starts generating the delayed MC group A1 according to the MC address (such as A1) and the delay.

When each ONT 302 receives the data of the MC group conversion request table (see FIG. 7), the ONT specifies the before-change MC group 701 and the after-change MC group 702 of the MC group conversion request table 313 (see FIG. 7) in the row of the next time participating MC group of the MC group conversion table (see FIG. 8) according to the data of the MC group conversion request table (see FIG. 7) in a process 907.

The L2SW 307 can specify multiple values for the delay 601, the MC group name 602, and the MC address 604 after the conversion at the L2SW 307. According to these settings, the L2SW 307 can generate data for a delayed MC group. The management number 600 can be specified as a sequence number. The process 1003 may be executed after the process 1004. In the present embodiment, the MC group name 602 is the same as the MC address 604 after the conversion at the L2SW as an example case. A different value determined in advance may be used.

(2) Joining after Delayed MC Group is Generated

In the following description, a case in which a delayed MC group is newly generated (No in process 1002) will be taken as an example.

Figure 15:
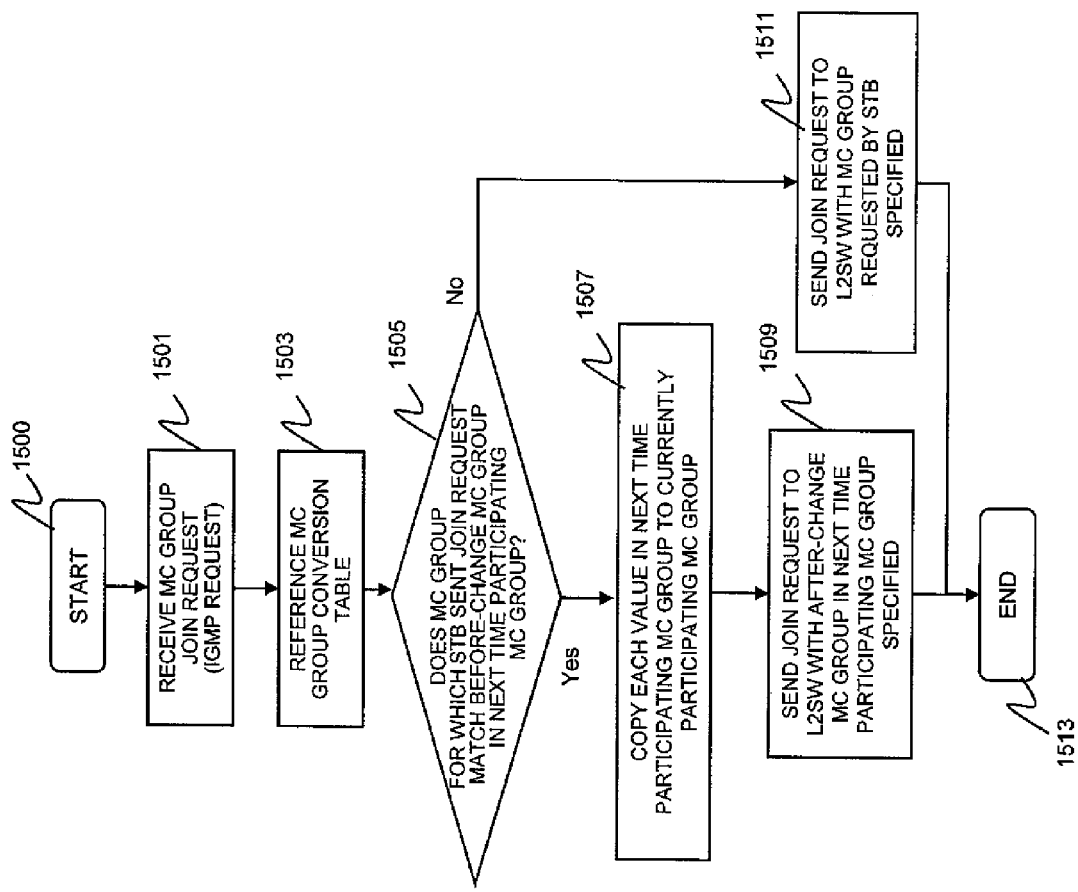
FIG. 15 is a flowchart of a procedure performed when an ONT receives a join request for joining an MC group.

FIG. 15 is a flowchart of a procedure performed when the ONT receives a join request for joining an MC group.

In the situation described above, it is assumed, for example, that the STB 2 301-2 sends a join request for joining the MC group A0 in a process 908 and in a process 1501. When the ONT 2 302-2 receives the IGMP request for the MC group A0 from the STB 2 301-2, the ONT 2 302-2 makes the IGMP processor 322-2 thereof reference the MC group conversion table (see FIG. 8) in a process 909 and in a process 1503. The ONT 302-2 determines whether the before-change MC group 801 in the row of the next time participating MC group in the MC group conversion table (see FIG. 8) matches the MC group for which the STB 2 301-2 sent the join request, in a process 1505. In the process 1505, when the before-change MC group 801 matches the MC group for which the STB 2 301-2 sent the join request, the ONT 302-2 makes the IGMP processor 322-2 thereof change the received MC group to the after-change MC group 802 in the row of the next time participating MC group, and then, sends the join request to the L2SW 307 in processes 910-1 and 910-2, and in a process 1509. In the current example, the MC group A0 is converted to the MC group A1.

Since the ONT 302 manages the currently participating MC group, the ONT 302 copies, after the process 909 (more specifically, after the process 1505), the before-change MC group 801 and the after-change MC group 802 in the row of the next time participating MC group to the before-change MC group 803 and the after-change MC group 804 in the row of the currently participating MC group, respectively, in processes 1507 and 1509. With this, the ONT 302 can hold information about the MC group in which the STB 301 is participating.

In the process 1505, when the before-change MC group 801 does not match the MC group for which the STB 2 301-2 sent the join request, the ONT 302-2 specifies the MC group for which the STB 2 301-2 sent the join request and sends a join request to the L2SW 307 in a process 1511.

When the L2SW 307 receives the IGMP request from the ONT 2 302-2, the L2SW 307 updates the delayed MC group management table (see FIG. 6) so as to perform accommodation into the delayed MC group A1 requested by the ONT 2 302-2 (more specifically, for example, increments the total number of ONTs participating in each MC group 605 for the MC group A1) in a process 911. The L2SW 307 also updates the number of participating ONTs 401 in the ONT management table (see FIG. 4) in the same way. More specifically, when the number of participating ONTs 401 is used to manage the number of participating ONTs for each MC group sent from the video server 311 (the sum of the total numbers of ONTs participating in each MC group 605 for the MC groups A0, A1, and A2), for example, the L2SW 307 increments the number of participating ONTs 401. When the number of participating ONTs 401 is used to manage the number of participating ONTs for each usual MC group, for example, the L2SW 307 increments the number of participating ONTs 401 only when the STB joins a usual MC group.

Then, since the L2SW 307 can determine that the join request is a join request for joining a delayed MC group (a delayed MC address) by referencing the MC address 603 sent from the video server 311 or the MC address 604 after the conversion at the L2SW 307 in the delayed MC group management table (see FIG. 6), the L2SW 307 sends a request for distributing the delayed data stream of the delayed MC group A1, to the delay buffer 305 in a process 912. When the delay buffer 305 receives the request, the delay buffer 305 starts distributing the delayed data stream of the delayed MC group A1 generated so far, to the ONT 2 302-2 in processes 913-1 and 913-2.

When the ONT 2 302-2 receives the data for the MC group A1 from the delay buffer 305, the ONT 2 302-2 references the MC group conversion table (see FIG. 8) to change the after-change MC group 804 in the row of the currently participating MC group to the before-change MC group 803 (actually returns the after-change MC group 804 to the original MC group in the request of the STB 301) in a process 914, and then, distributes the data for the MC group A0 to the STB 2 301-2 in a process 915. With the above-described method, the STB 2 301-2 receives the same data (the data for the MC group A0, for example) as the STB 1 301-1, delayed by a time period (several seconds, for example) specified by the delay.

(3) Deleting a Delayed MC Group

An operation performed when users' concentration on a specific program is lowered and congestion is relieved will be described next.

Figure 11:
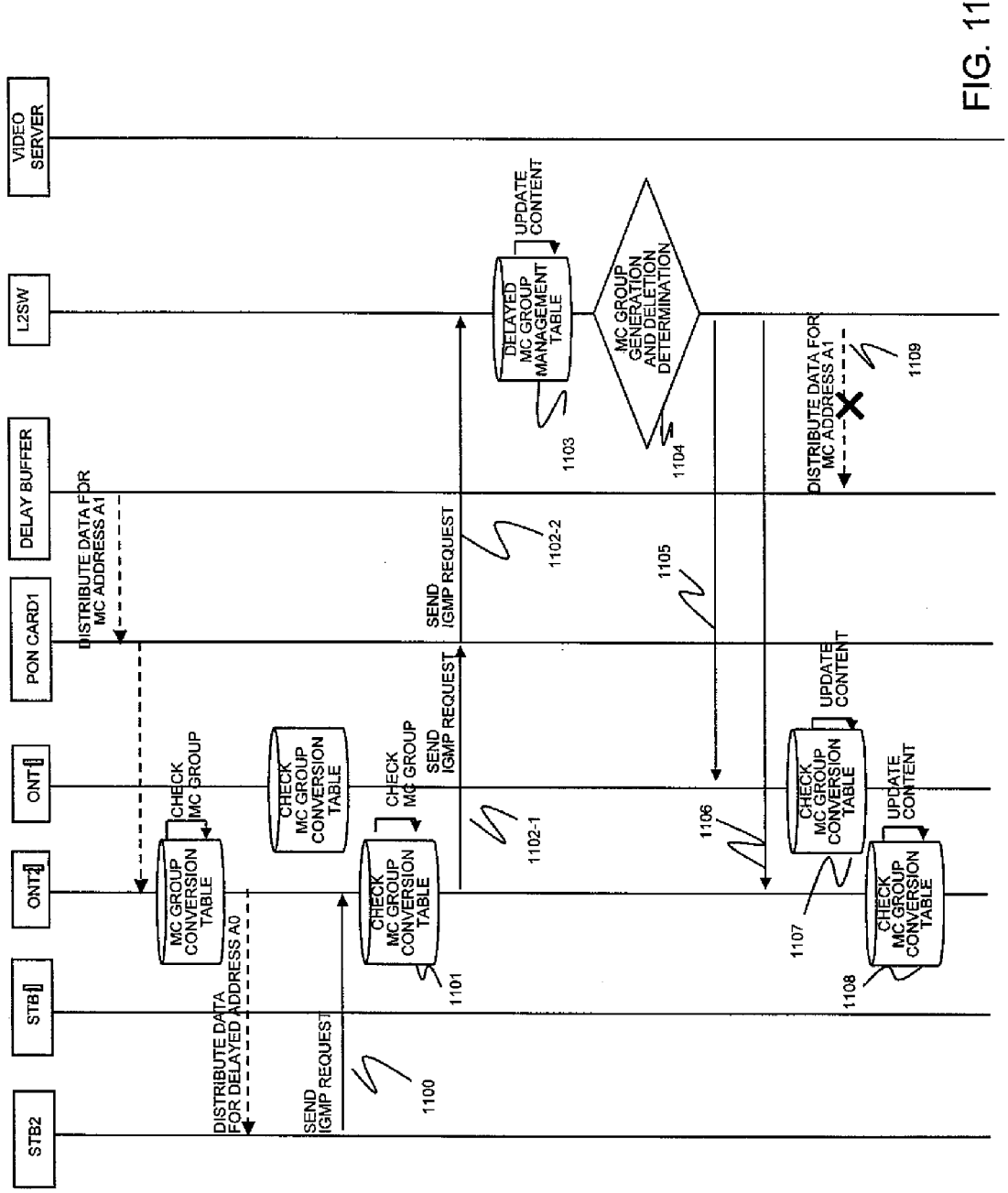
FIG. 11 is a sequence diagram of MC group deletion.

FIG. 11 is a sequence diagram of MC group deletion.

Figure 16:
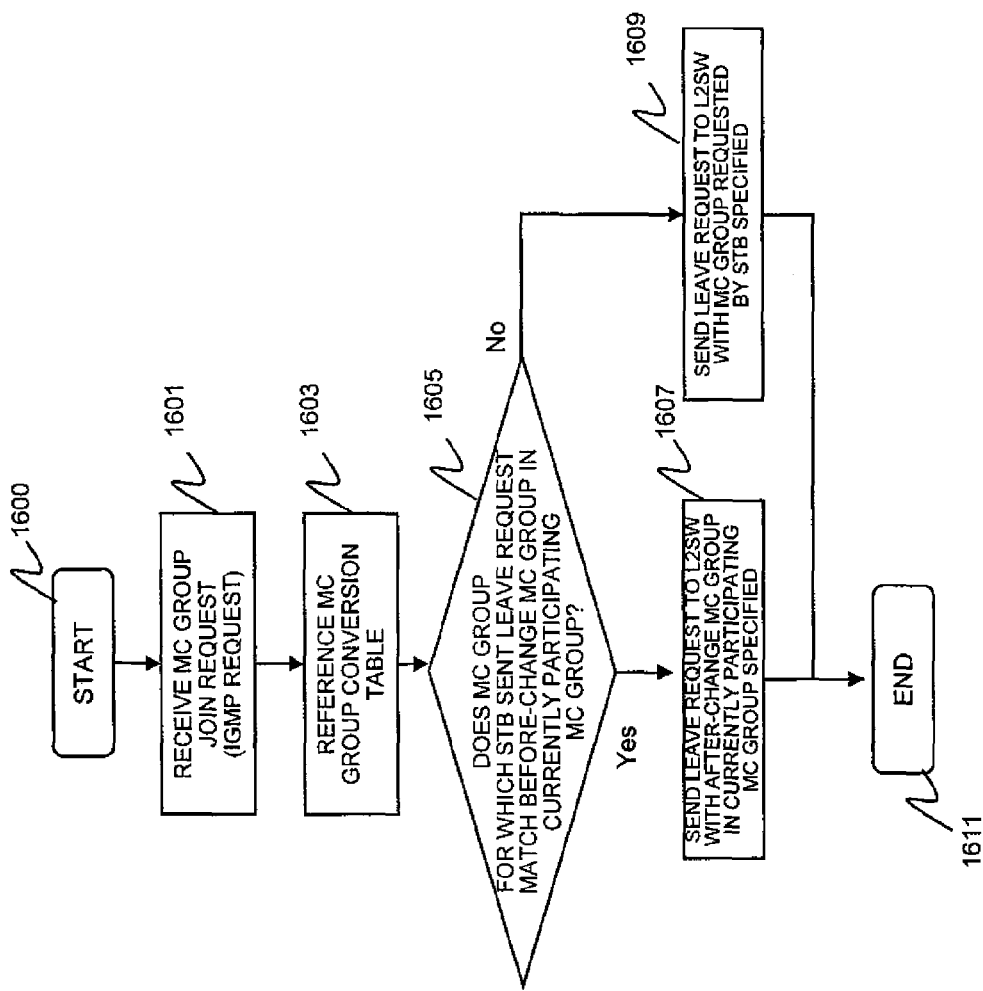
FIG. 16 is a flowchart of a procedure performed when the ONT receives a leave request for leaving from an MC group.

FIG. 16 is a flowchart of a procedure performed when the ONT receives a leave request for leaving from an MC group.

The sequence diagram in FIG. 11 follows the sequence diagram in FIG. 9, and a case in which the STB 2 301-2 leaves from a delayed MC group is taken as an example.

When the number of ONTs 302 participating in a delayed MC group becomes zero (more specifically, for example, when the total number of ONTs participating in each MC group 605 for any delayed MC group in the delayed MC group management table 306 (see FIG. 6) becomes zero), the delayed MC group can be deleted. A delayed MC group deletion method will be given below.

It is assumed that the STB 2 301-2 distributes an IGMP request (IGMP leave) for leaving from the MC group A0 in which the STB 2 301-2 has participated so far, to the ONT 2 302-2 in processes 1100 and 1601. When the ONT 2 302-2 receives the IGMP request from the STB 2 301-2, the ONT 2 302-2 makes the IGMP processor 322-2 thereof reference the MC group conversion table (see FIG. 8) in processes 1101 and 1603. The ONT 2 302-2 determines whether the before-change MC group 803 in the row of the currently participating MC group in the MC group conversion table (see FIG. 8) matches the MC group for which the STB 2 301-2 sent the leave request, in a process 1605. In the process 1605, when the ONT 2 302-2 determines that the before-change MC group 803 matches the MC group for which the STB 2 301-2 sent the leave request, the ONT 2 302-2 changes the MC group for which the STB 2 301-2 sent the leave request to the after-change MC group 804 in the row of the currently participating MC group in the MC group conversion table (see FIG. 8) (in the current example, it is assumed that the MC group A0 is stored in the before-change MC group and the MC group A1 is stored in the after-change MC group in the row of the currently participating MC group), and then, sends the leave request to the L2SW 307 in the OLT 300 in processes 1102-1 and 1102-2, and a process 1607.

In the process 1605, when the before-change MC group 803 does not match the MC group for which the STB 2 301-2 sent the leave request, the ONT 302-2 specifies the MC group for which the STB 2 301-2 sent the leave request and sends the leave request to the L2SW 307 in a process 1609.

When both the currently participating MC group and the next time participating MC group are managed in this manner, even if the ONT 302 receives a request for leaving from the MC group A0 from the STB 301 after the ONT 302 receives the data of an MC group conversion request (see FIG. 7) from the OLT 300, for example, the ONT 302 can obtain the after-change MC group correctly by referencing the row of the currently participating MC group. In the same way, if the ONT 302 receives a request for joining the MC group A0 from the STB 301, the ONT 302 can obtain the after-change MC group correctly by referencing the row of the next time participating MC group.

When the L2SW 307 receives the leave IGMP request from the ONT 2 302-2, the L2SW 307 updates the delayed MC group management table (see FIG. 6) (more specifically, for example, decrements the total number of ONTs participating in each MC group 605 for the MC group A1) in a process 1103. The L2SW 307 also updates the number of participating ONTs 401 in the ONT management table (see FIG. 4) in the same way. More specifically, when the number of participating ONTs 401 is used to manage the number of participating ONTs for each MC group sent from the video server 311 (the sum of the total numbers of ONTs participating in each MC group 605 for the MC groups A0, A1, and A2), for example, the L2SW 307 decrements the number of participating ONTs 401. When the number of participating ONTs 401 is used to manage the number of participating ONTs for each usual MC group, for example, the L2SW 307 decrements the number of participating ONTs 401 only when the STB leaves from a usual MC group.

Then, the L2SW 307 executes a process 1104 according to the flowchart of the MC group generation and deletion determination shown in FIG. 10. When the L2SW 307 receives a leave IGMP request, the L2SW 307 determines whether the total number of ONTs participating in each MC group 605 for a delayed MC group in the delayed MC group management table (see FIG. 6) is equal to zero in the process 1001 (even if the number of participating ONTs is zero, the usual MC group is not deleted). When the number of ONTs participating in a delayed MC group becomes zero due to the leave IGMP request (the total number of ONTs participating in each MC group=0 in the process 1001), the L2SW 307 determines in a process 1008 whether a join is possible for another existing delayed MC group other than the delayed MC group in the same way as in the process 1002, described above.

When the number of ONTs participating in the delayed MC group is zero but a join is impossible for another existing delayed MC group other than the delayed MC group (No in the process 1008), the L2SW 307 does not delete the delayed MC group in a process 1010. This is because leaving the delayed MC group eliminates a burden of generating a new delayed MC group again. If a join is impossible for another existing delayed MC group, a new delayed MC group needs to be generated.

When the number of ONTs participating the delayed MC group is zero and a join is possible for another existing delayed MC group other than the delayed MC group (Yes in the process 1008), the L2SW 307 generates an MC group conversion request table (see FIG. 7) such that the STB joins the delayed MC group for which it is determined that a join is possible, and distributes the table to all the ONTs 302 in processes 1009, 1105, and 1106. Then, the L2SW 307 deletes the delayed MC group for which the total number of ONTs participating in each MC group 605 becomes zero, from the delayed MC group management table (see FIG. 6) in a process 1011, and finishes generating the delayed MC group, performed by the delay buffer 305, at the same time in the process 1109.

When each ONT 302 receives the data of the MC group conversion request table (see FIG. 7), the ONT 302 updates the MC group conversion table (see FIG. 8) in processes 1107 and 1108.

With such MC group deletion processing, the delayed MC group that is not necessary any more can be deleted without affecting the users participating in other MC groups. In addition, with the above-described delayed MC group generation method, when a new MC group is generated, an MC group having the shortest delay (including the MC group A0) is searched for and the STB is made to participate in the MC group having the shortest delay. Therefore, only usual MC groups will exist in the future.

2. Second Embodiment

Hardware Structure

Figure 14:
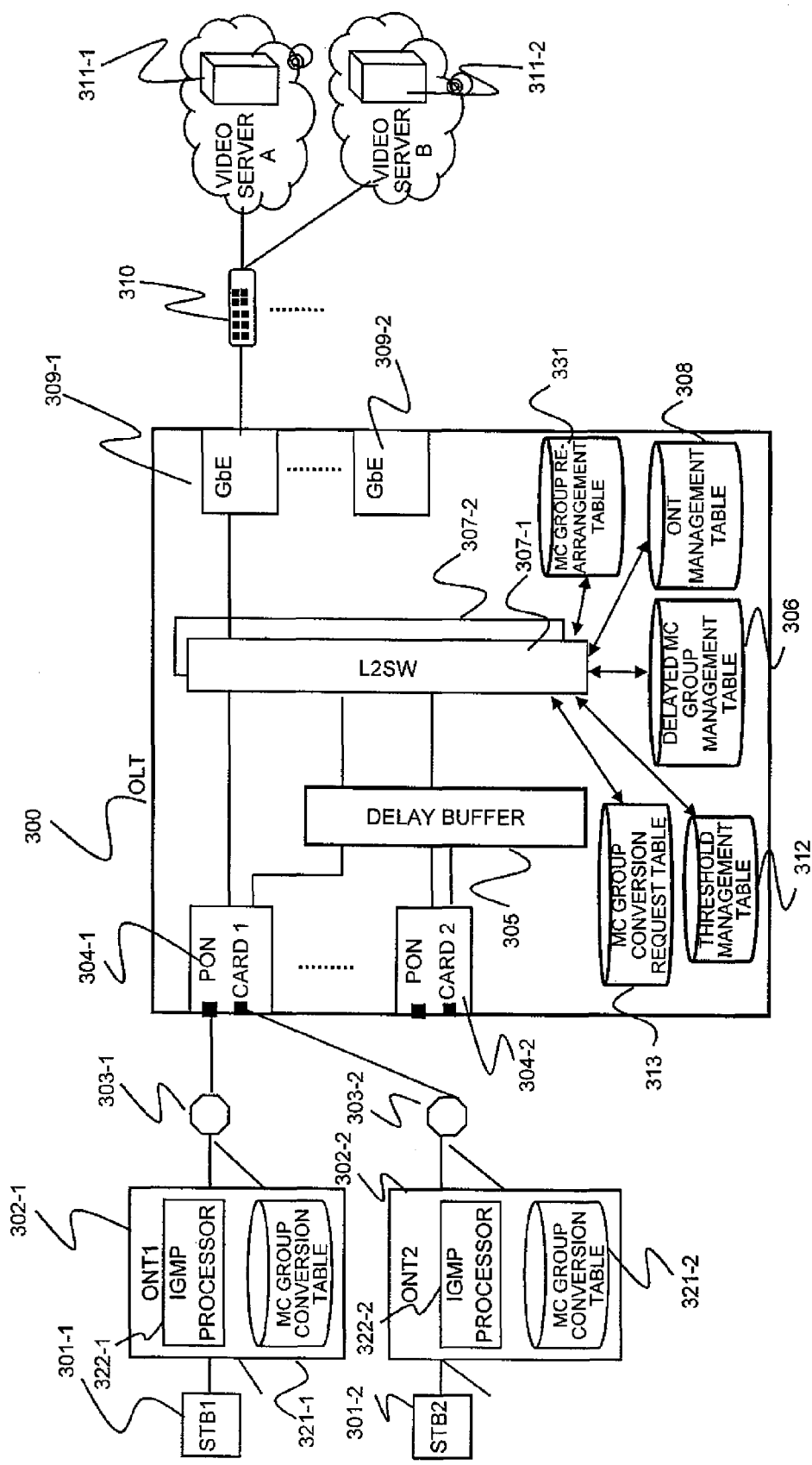
FIG. 14 is a block diagram of a PON system according to the second embodiment of the present invention.

FIG. 14 shows the structure of a PON system according to a second embodiment of the present invention.

The PON system of the second embodiment includes an MC group re-arrangement table 331 in addition to the structure of the PON system of the first embodiment.

Table Structure

FIG. 13 shows the format of the MC group re-arrangement table 331.

The MC group re-arrangement table 331 is generated by using the delayed MC group management table (see FIG. 6). MC groups for which a join is possible in the delayed MC group management table (see FIG. 6) are arranged in an ascending order of delay, with re-arrangement numbers 1300 attached. The other elements are the same as those in the delayed MC group management table (see FIG. 6).

Operation

Figure 12:
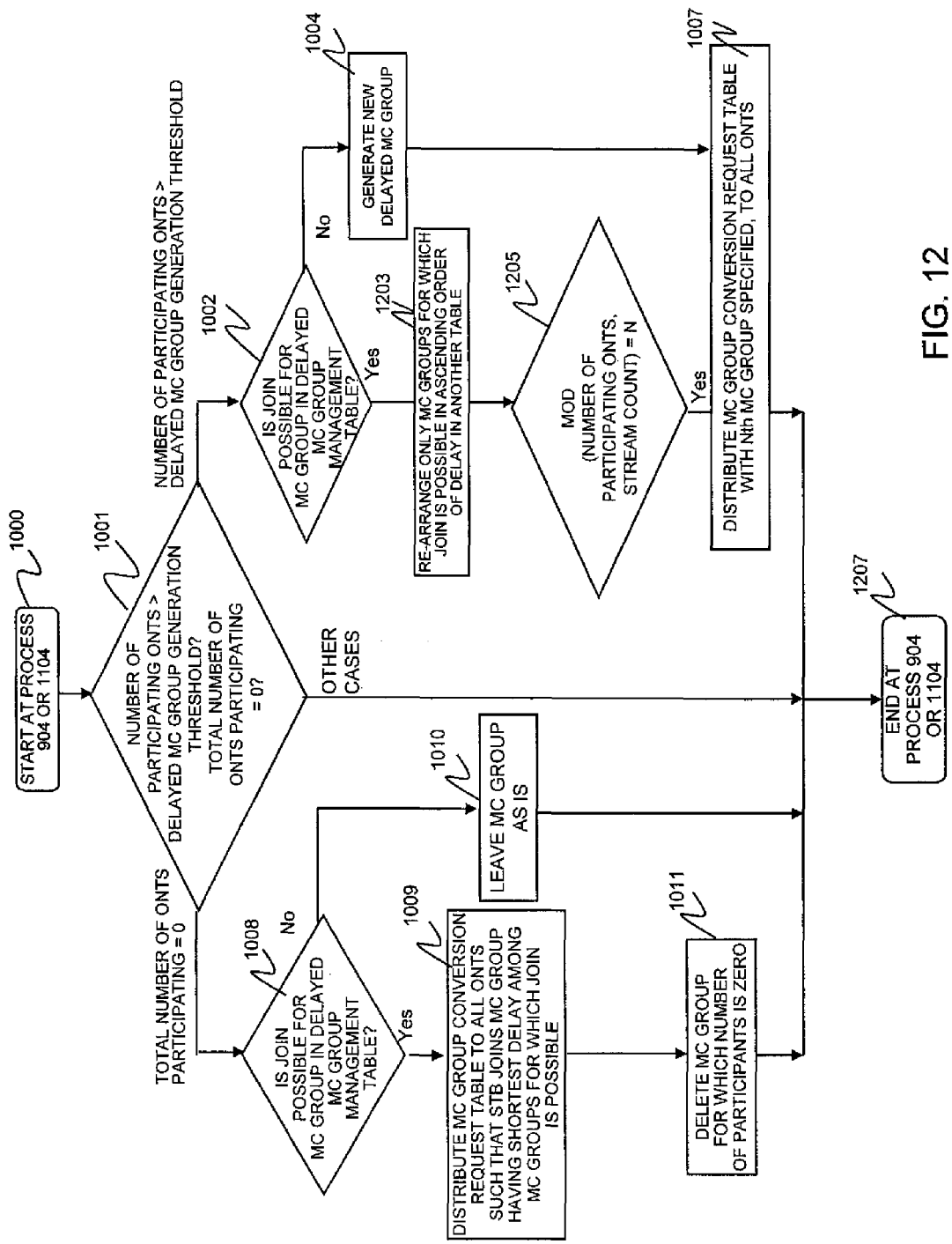
FIG. 12 is a flowchart of a second embodiment.

FIG. 12 is a flowchart of processing in the second embodiment.

The flowchart of FIG. 12 in the second embodiment is the same as the flowchart of FIG. 10 in the first embodiment except that processes 1203 and 1205 are added and the processes 1003, 1005, and 1006 are deleted.

In the operation of the first embodiment, when a join is possible for an existing delayed MC group, the STB joins the MC group having the shortest delay as indicated by the processes 1002 to 1007 in the flowchart of FIG. 10. This processing part is changed as follows: In a process 1203, the L2SW 307 extracts MC groups for which a join is possible and re-arranges them in an ascending order of delay, with the re-arrangement numbers 1300 attached, to generate the MC group re-arrangement table (see FIG. 13); and then, in a process 1205, the L2SW 307 references the MC group re-arrangement table (see FIG. 13) to perform, for example, a calculation of MOD (the total number of ONTs participating in an identical MC group, the number of MC groups for which a join is possible)=N (N indicates the re-arrangement number), where MOD (a, b) indicates a remainder operation of calculating the remainder when the argument "a" is divided by the argument "b". In the process 1007, the L2SW 307 generates an MC group conversion request table (see FIG. 7) such that the STB joins the MC group having the re-arrangement number 1300 calculated in the process 1205.

In other words, the name of the MC group to be connected next or the MC address to be connected next to each ONT 302 can be selected uniformly among MC groups having an identical content and existing at that time point.

The present invention can be used in PON systems, for example. The MC group name may be the MC address or appropriate MC group identification information for identifying each MC group.

What is claimed is:

1. A communication system in which an optical line terminal (OLT) connected to a multicast (MC) stream server is connected to one or a plurality of optical network terminals (ONTs) for MC stream termination accommodating one or a plurality of subscriber terminals with a passive optical network that includes a core optical fiber, an optical splitter/coupler, and a plurality of local optical fibers, the OLT comprising:
an ONT management table for recording the number of participating ONTs for each identification information of an MC group serving as a group of MC stream;
a delayed MC group management table for managing a before-conversion MC address, an after-conversion MC address, and the number of ONTs participating in a corresponding MC group or delayed MC group, sent from the server, in response to identification information of each MC group or identification information of a delayed MC group serving as a group for delayed stream having the same content as MC stream with distribution timing delayed by a delay time specified in advance from the MC stream;
an MC group conversion request table for storing identification information of an after-conversion MC group corresponding to identification information of a before-conversion MC group;
a delay buffer for generating one or a plurality of delayed stream in response to the identification information of the after-conversion MC group and for distributing the delayed stream; and
a processing section for generating or changing the ONT management table, the delayed MC group management table, and/or the MC group conversion request table according to a join request received from one of the subscriber terminals, for controlling the delay buffer, and for distributing the stream;
wherein
each of the ONTs comprising an MC group conversion table for storing the identification information of an after-conversion MC group in association with the identification information of a before-conversion MC group for which the join request was sent, for current participation and next-time participation;
when the processing section of the OLT references the ONT management table and finds according to the identification information of the MC group for which the join request was sent from the subscriber terminal that the number of ONTs participating in the MC group is larger than a threshold determined in advance,
if the processing section of the OLT references the delayed MC group management table and finds that the number of ONTs participating in any MC group or delayed MC group does not exceed the threshold determined in advance, the processing section of the OLT generating the MC group conversion request table according to a before-conversion MC address and an after-conversion MC address of the MC group or the delayed MC group for which the threshold is not exceeded;
and the processing section of the OLT distributing data of the MC group conversion request table as a conversion request to the one or the plurality of ONTs;
the processing section of the OLT sending the MC stream received from the video server, corresponding to the after-conversion MC address or the identification information of the delayed group, to the delay buffer, and making the delay buffer start or continue generating delayed stream with a delay determined in advance;
when each of the ONTs receives the conversion request from the OLT, the ONT storing the identification information of the after-conversion MC group in association with the identification information of the before-conversion MC group, in a next-time participation entry of the MC group conversion table;
when each of the ONTs receives a join request for joining the before-conversion MC group from one of the subscriber terminals, the ONT converting the identification information of the before-conversion MC group to the identification information of the after-conversion MC group according to the next-time participation entry of the MC group conversion table and sending a join request to the OLT; and
the OLT distributing the delayed stream from the delay buffer to the ONT according to the identification information of the before-conversion MC group.

2. A communication system according to claim 1, wherein, when the processing section of the OLT receives a join request for joining an after-conversion MC group, the processing section updates the number of participating ONTs in the ONT management table and/or the delayed MC group management table according to the join request and requests the delay buffer to distribute the delayed stream of the after-conversion MC group to the subscriber terminal.

3. A communication system according to claim 1, wherein, when the ONT receives the delayed stream of the after-conversion MC group from the OLT, the ONT converts the after-conversion multicast address to the before-conversion multicast address according to the MC group conversion table, and then, distributes the delayed stream to the one or the plurality of subscriber terminals accommodated by the ONT.

4. A communication system according to claim 1, wherein, when the ONT receives a join request for joining the before-conversion MC group for the next-time participation from the subscriber terminal, the ONT copies the next-time participation entry to an entry of the current participation.

5. A communication system according to claim 1, wherein, when a join is impossible for the after-conversion MC group, the processing section of the OLT generates an entry of a delayed MC group having a longer delay than the current delayed MC group and stores the entry in the delayed MC group management table.

6. A communication system according to claim 1, wherein, when the processing section of the OLT receives a leave request, the processing section references the delayed MC group management table, and, when there is a delayed MC group for which the number of participating ONTs is zero and a join is possible for another existing MC group or delayed MC group, the processing section deletes the entry of the delayed MC group for which the number of participating ONTs is zero, from the delayed MC group management table.

7. A communication system according to claim 1, wherein an MC group or delayed MC group for which a join is possible is uniformly assigned among existing MC groups or delayed MC groups stored in the delayed MC group management table, according to the after-conversion MC group.

8. A communication system according to claim 1, wherein an MC group or delayed MC group for which a join is possible is assigned to a group having the shortest delay among existing MC groups or delayed MC groups stored in the delayed MC group management table, according to the after-conversion MC group.

9. An optical line terminal (OLT) in a communication system in which the OLT connected to a multicast (MC) stream server is connected to one or a plurality of optical network terminals (ONTs) for MC stream termination accommodating one or a plurality of subscriber terminals with a passive optical network that includes a core optical fiber, an optical splitter/coupler, and a plurality of local optical fibers, the OLT comprising:
an ONT management table for recording the number of participating ONTs for each identification information of an MC group serving as a group of MC stream;
a delayed MC group management table for managing a before-conversion MC address, an after-conversion MC address, and the number of ONTs participating in a corresponding MC group or delayed MC group, sent from the server, in response to identification information of each MC group or identification information of a delayed MC group serving as a group for delayed stream having the same content as MC stream with distribution timing delayed by a delay time specified in advance from the MC stream;
an MC group conversion request table for storing identification information of an after-conversion MC group corresponding to identification information of a before-conversion MC group;
a delay buffer for generating one or a plurality of delayed stream in response to the identification information of the after-conversion MC group and for distributing the delayed stream; and
a processing section for generating or changing the ONT management table, the delayed MC group management table, and/or the MC group conversion request table according to a join request received from one of the subscriber terminals, for controlling the delay buffer, and for distributing the stream; wherein,
when the processing section of the OLT references the ONT management table and finds according to the identification information of the MC group for which the join request was sent from the subscriber terminal that the number of ONTs participating in the MC group is larger than a threshold determined in advance,
if the processing section of the OLT references the delayed MC group management table and finds that the number of ONTs participating in any MC group or delayed MC group does not exceed the threshold determined in advance, the processing section of the OLT generating the MC group conversion request table according to a before-conversion MC address and an after-conversion MC address of the MC group or the delayed MC group for which the threshold is not exceeded;
and the processing section of the OLT distributing data of the MC group conversion request table as a conversion request to the one or the plurality of ONTs, and making each of the ONTs, according to the conversion request from the OLT, store the identification information of the after-conversion MC group in association with the identification information of the before-conversion MC group, in a next-time participation entry of the MC group conversion table;
the processing section of the OLT sending the MC stream received from the video server, corresponding to the after-conversion MC address or the identification information of the delayed group, to the delay buffer, and making the delay buffer start or continue generating delayed stream with a delay determined in advance;
when each of the ONTs receives a join request for joining the before-conversion MC group from one of the subscriber terminals, the ONT converting the identification information of the before-conversion MC group to the identification information of the after-conversion MC group according to the next-time participation entry of the MC group conversion table and sending a join request to the OLT, and the OLT distributing the delayed stream from the delay buffer to the ONT according to the identification information of the before-conversion MC group.

10. A congestion control method in a communication system in which an optical line terminal (OLT) connected to a multicast (MC) stream server is connected to one or a plurality of optical network terminals (ONTs) for MC stream termination accommodating one or a plurality of subscriber terminals with a passive optical network that includes a core optical fiber, an optical splitter/coupler, and a plurality of local optical fibers,
when a number of users equal to or larger than a threshold center on a specific MC group, the OLT generating, in a delayed MC group management table for managing a before-conversion MC address, an after-conversion MC address, and the number of ONTs participating in a corresponding MC group or delayed MC group, sent from the server, in response to identification information of each MC group or identification information of a delayed MC group serving as a group for delayed stream having the same content as MC stream with distribution timing delayed by a delay time specified in advance from the MC stream, an entry for the identification information of the delayed MC group, and
making a delay buffer for generating one or a plurality of delayed stream in response to the identification information of an after-conversion MC group and for distributing delayed stream start or continue generating delayed stream with the specified delay time in response to the after-conversion MC address or the identification information of the delayed MC group;
when an ONT receives a new connection request for a before-conversion MC group from the subscriber terminal, the ONT converting the identification information of the before-conversion MC group for which join request was sent, to the identification information of the after-conversion MC group and sending a connection request for the identification information of the after-conversion MC group of the delayed stream, to the OLT; and
the OLT distributing the delayed stream from the delay buffer to the ONT according to the identification information of the after-conversion MC group.

* * * * *